UNITED STATES PATENT OFFICE.

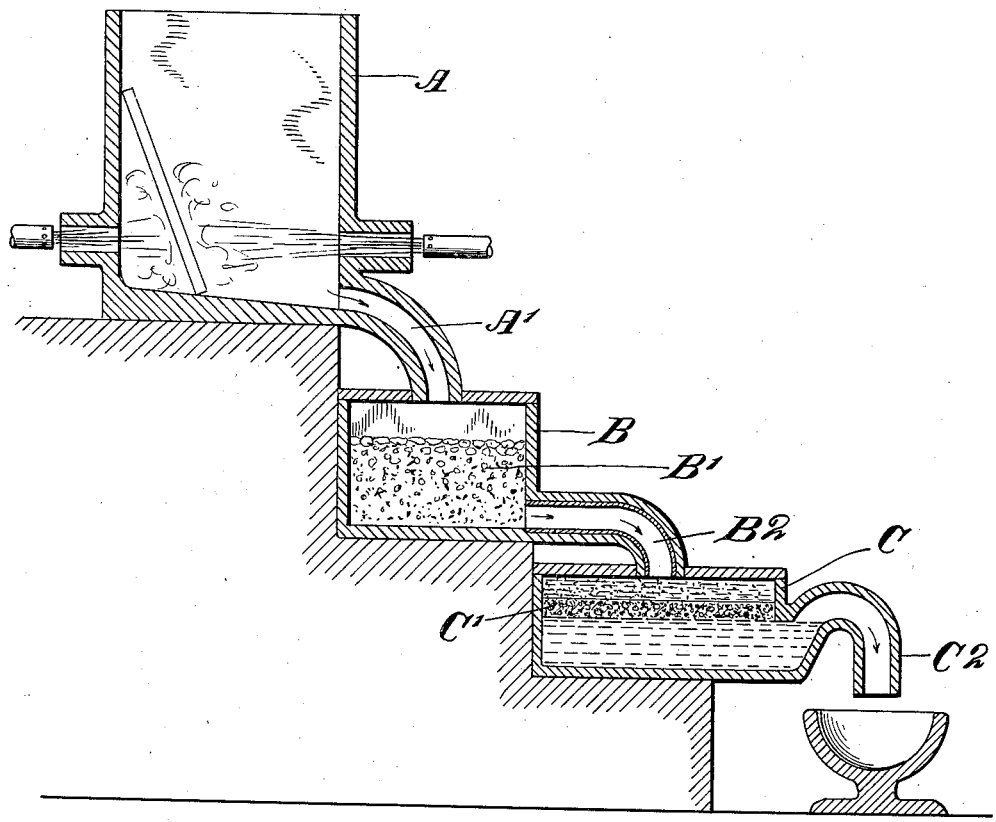

WALTER S. ROCKEY AND HILLIARY ELDRIDGE, OF NEW YORK, N. Y., ASSIGNORS TO METALLURGICAL RESEARCH COMPANY, A CORPORATION OF ARIZONA.

PROCESS OF REFINING COPPER.

1,037,538. Specification of Letters Patent. Patented Sept. 3, 1912.

Application filed February 23, 1911. Serial No. 610,224.

*To all whom it may concern:*

Be it known that we, WALTER S. ROCKEY and HILLIARY ELDRIDGE, citizens of the United States, both residing at New York city, in the county of New York and State of New York, have invented certain new and useful Improvements in the Process of Refining Copper, of which the following is a full, clear, and exact specification.

Our invention relates to the purification and refining of copper, particularly cathode copper, and the object of our invention is to provide a process of refining copper.

In carrying out our process we fuse the copper by exposing it to the direct heat of a furnace so as to melt the copper as rapidly as possible regardless of its contamination by the furnace gases and the atmosphere, and to remove said contamination afterward by flowing the copper before casting, into intimate contact with carbon, and preferably, first into carbon and then into and through and under a suitable flux, such as a flux of anhydrous boron trioxid ($B_2O_3$) or one containing anhydrous boron trioxid, any of which fluxes should also preferably contain carbon, and afterward leading the copper into suitable molds or a ladle.

In carrying out our process, we first provide a suitable melting furnace such as a fuel oil blast furnace which is provided with the usual metal charging orifice and an outlet for the molten metal.

Referring to the drawing which forms a part of this specification, we disclose diagrammatically a furnace and purifying chambers shown in cross section, by means of which our process will be described.

In this furnace indicated by A, we fuse the copper in the open flame as rapidly as possible, and in so doing a certain amount of copper oxid is formed by the combination of atmospheric oxygen with a portion of the copper. The copper may also contain carbonate of copper. This impurity combining with the copper, reduces its electrical conductivity and impairs its tensile strength. To remove these impurities and regain electrical conductivity and tensile strength, we cause the copper after fusion in the furnace A, to flow therefrom through the outlet A' into intimate contact with carbon B' located in chamber B, or through a carbon lined conduit $B^2$, which partially purifies or refines the copper. The copper then flows into a chamber C and through a flux C' such as previously mentioned, which preferably contains carbon and the surface of which is covered with carbon, preferably in powdered form, which finishes the purification process. The flux protects the copper from the atmosphere until it flows from beneath the flux through the siphon shaped outlet $C^2$ into a ladle or mold. It will be understood that the chambers containing the carbon, and the flux and carbon, are heated by proper means to keep them from chilling the copper as it flows through them to the ladle or molds. The further function performed by the flux is to dissolve or hold in suspension the copper oxid remaining in the molten copper after the copper has been treated by the carbon alone, which oxid, upon dissolving or floating upward from the molten copper into the flux, is reduced to metallic copper by the carbon contained in the flux. The copper is flowed into the ladle or molds at a sufficient distance from the furnace gases to preclude the possibility of further contamination thereby.

Having thus described our invention we claim as new:

1. The process of refining copper which comprises exposing the same to the heat of a furnace and its gases until reduced to a molten condition, then removing the copper from exposure to said gases and into intimate contact with carbon to purify said copper.

2. The process of refining copper consisting in exposing the same to the heat of a furnace and its gases until reduced to a molten condition, then removing the copper from exposure to said gases and into intimate contact with carbon to purify said copper, and then passing said copper through and under a protective flux.

3. The process of refining copper consisting in exposing the same to the heat of a furnace and its gases until reduced to a molten condition, then removing the copper from exposure to said gases and into intimate contact with carbon to purify said copper, and then passing said copper through and under a flux containing anhydrous boron trioxid.

4. The process of refining copper consisting in exposing the same to the heat of a furnace and its gases until reduced to a molten condition, then removing the copper from exposure to said gases and into intimate contact with carbon to purify said copper, and then passing said copper through and under a flux of anhydrous boron trioxid containing carbon.

5. The process of treating copper which comprises exposing the same to the heat of a furnace and its gases until reduced to a molten condition, then removing the copper from exposure to said gases and into intimate contact with carbon to purify said copper, and then flowing said copper to the ladle or mold out of contact with said furnace gases.

6. The process of treating copper consisting in exposing the same to the heat of a furnace and its gases until reduced to a molten condition, then removing the copper from exposure to said gases and into intimate contact with carbon to purify said copper, then passing said copper through and under a protecting flux of anhydrous boron trioxid containing carbon, and then flowing said copper to a ladle or mold out of contact with said furnace gases.

7. The process of treating copper consisting in exposing the same to the heat of a furnace and its gases until reduced to a molten condition, then removing the copper from exposure to said gases and into intimate contact with carbon to purify said copper, then passing said copper through and under a protecting flux containing carbon and then flowing said copper to a ladle or mold out of contact with said furnace gases.

8. The process of purifying copper containing carbonate of copper and copper oxid, consisting in reducing the copper to a molten condition by heat, then removing the copper from exposure to the source of heat, and bringing the copper into intimate contact with carbon until the greater portion of the copper oxid is reduced, and then flowing the copper into a ladle or mold but out of contact with the furnace gases.

9. The process of treating copper, which consists in melting copper in a chamber by means of highly heated products of combustion of a fluid fuel burner regulated to produce an oxidizing flame, and continuously removing the copper.

10. The process of treating copper, which consists in heating copper in a chamber by means of the highly heated products of combustion of a hydrocarbon burner regulated to produce an oxidizing atmosphere, and removing the copper.

11. The process of treating copper, which consists in melting copper in a chamber by means of highly heated products of combustion, removing the copper, and subjecting the copper to a reducing medium.

12. The process of treating copper, which consists in melting copper in a chamber by means of the highly heated products of combustion of a fluid fuel burner, removing the copper to a point exterior of said chamber, and delivering the copper to a refining medium.

13. The process of treating copper, which consists in melting copper in a chamber by means of the highly heated products of combustion of a fluid fuel regulated to produce an oxidizing atmosphere, removing the copper to a point exterior of the chamber, and delivering the copper into a refining chamber.

14. The process of treating copper, which consists in continuously melting copper in an oxidizing atmosphere, continuously removing the copper from the oxidizing atmosphere, and subjecting the copper to the action of a reducing medium.

15. The process of treating copper, which consists in continuously melting copper in an oxidizing atmosphere, continuously removing the copper from the oxidizing atmosphere, and continuously reducing the copper.

16. The process of treating copper, which consists in continuously melting copper in a chamber by means of highly heated products of combustion regulated to produce an oxidizing flame, and removing the copper.

17. The process of treating copper, which consists in continuously melting copper in a chamber by means of highly heated products of combustion, continuously removing the copper to a point exterior of said chamber, and continuously delivering the copper into a refining medium.

18. The process of treating copper, which consists in continuously melting copper in a chamber by means of the highly heated products of combustion of a hydrocarbon burner regulated to produce an oxidizing atmosphere, thereby producing an amount of copper oxid in said copper, and liberating the oxygen from said oxid by subjecting the copper to the action of a reducing agent.

19. The process of refining copper, which consists in first melting the copper, then subjecting the melted copper to the reducing action of a body of the carbon group, and then to the action of an anhydrous body which will separate therefrom any remaining oxid.

20. The process of refining copper, which consists in first melting the copper, then subjecting it to the action of a reducing agent, and then to the action of a dissolving agent.

21. The process of refining copper, which consists in first melting the copper, and then subjecting it to the action of a reducing agent, and then to the action of a dissolving agent which will dissolve metallic oxids.

22. The process of refining copper, which consists in first melting the copper, then subjecting it to the action of a reducing agent which will coact with the free oxygen to form bodies of the CO group, and then to the action of a dissolving agent.

In testimony whereof we affix our signatures in presence of two witnesses.

WALTER S. ROCKEY.
HILLIARY ELDRIDGE.

Witnesses:
G. F. QUACKINBUSH,
HENRY J. JANSSEN.